Figure 1:
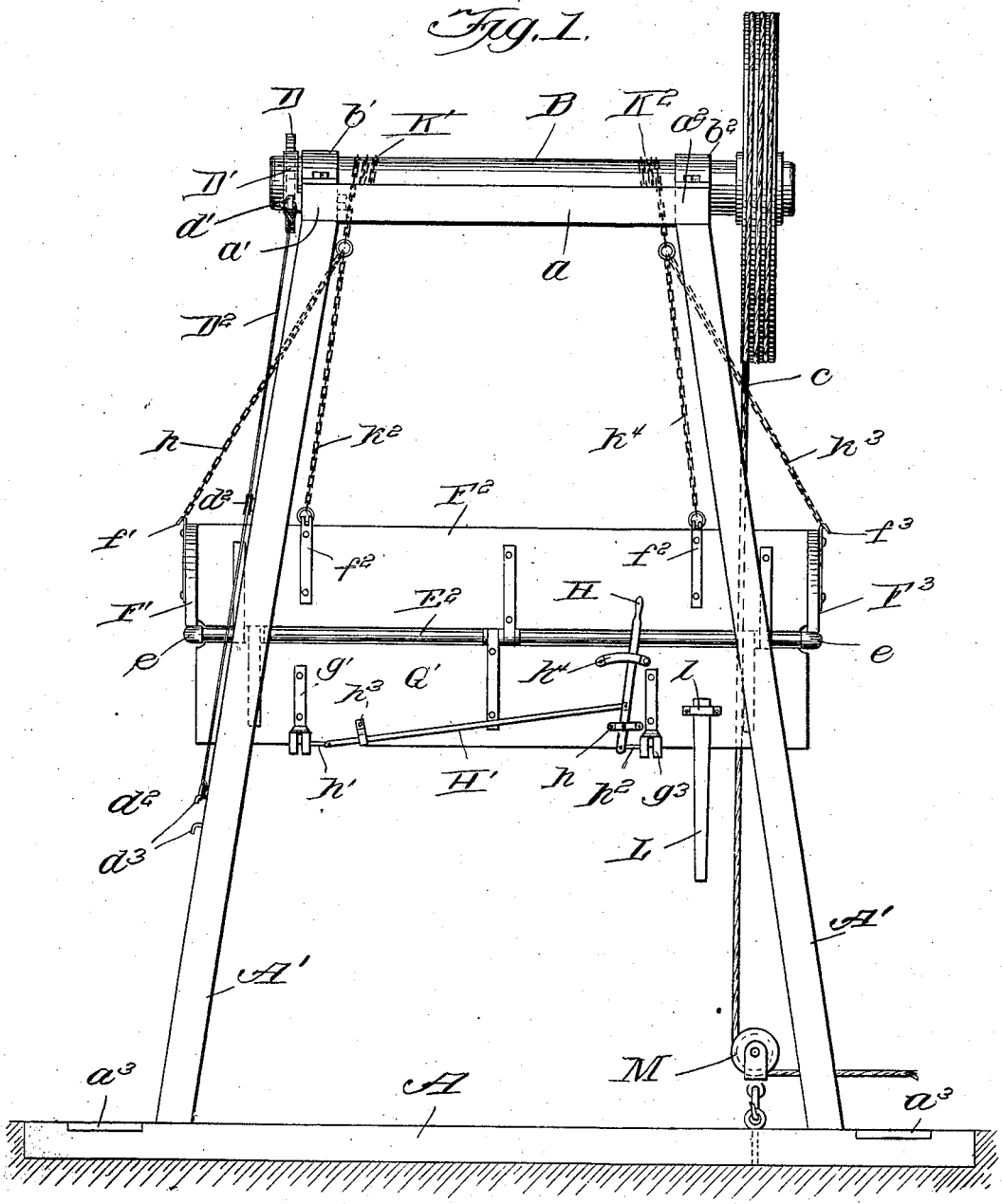

No. 833,549. PATENTED OCT. 16, 1906.
S. B. RAW.
LOADING APPARATUS.
APPLICATION FILED APR. 2, 1906.

2 SHEETS—SHEET 1.

Witnesses:
H. S. Gaither
C. A. Mullen

Inventor:
Simon B. Raw
by Chamberlin & Wilkinson
att'ys

No. 833,549.                                                        PATENTED OCT. 16, 1906.
S. B. RAW.
LOADING APPARATUS.
APPLICATION FILED APR. 2, 1906.

2 SHEETS—SHEET 2.

Witnesses:                                                          Inventor:
                                                                    Simon B. Raw
                                                                    by Chamberlin & Wilkinson
                                                                    Attys

UNITED STATES PATENT OFFICE.

SIMON B. RAW, OF BRITT, IOWA.

LOADING APPARATUS.

No. 833,549.	Specification of Letters Patent.	Patented Oct. 16, 1906.

Application filed April 2, 1906. Serial No. 309,301.

*To all whom it may concern:*

Be it known that I, SIMON B. RAW, a citizen of the United States, residing at Britt, county of Hancock, State of Iowa, have invented a certain new and useful Improvement in Loading Apparatus; and I declare the following to be a full, clear, and exact description of the invention, such as will enable others skilled in the art to which it pertains to make and use the same, reference being had to the accompanying drawings, which form a part of this specification.

My invention relates in general to loading apparatus, and more particularly to mechanism for lifting material from the ground and depositing the same in a wagon.

The loading of material such as manure from the ground upon a wagon by hand is a slow and tedious process requiring much time and labor. Much economy in time and expense results from the employment of manually-operated hoisting mechanism capable of transferring at a single operation from the ground to the wagon a quantity of material many times greater than could be lifted directly by hand.

The primary object of my invention is to provide an apparatus upon which material may be transferred from the ground by a scraper and which may then be elevated to permit a wagon to pass beneath the same to receive the material.

A further object of my invention is to provide an apparatus of the character described which will be simple in construction, inexpensive in manufacture, and efficient in use.

The embodiment of my invention herein disclosed may be generally described as consisting in a folding hopper composed of a frame to which upwardly-swinging sides and a downwardly-swinging bottom are pivoted, so that the hopper may be spread out horizontally upon the ground to receive material, means for locking the bottom horizontally within the frame, means for elevating the hopper and simultaneously swinging upwardly the sides thereof, so as to permit a wagon being located beneath the same, and means for unlocking the bottom, so that it may swing downwardly and permit the material in the hopper to fall into the wagon.

My invention will be more fully described hereinafter with reference to the accompanying drawings, in which the same is illustrated as embodied in a convenient and practical form, and in which—

Figure 2:
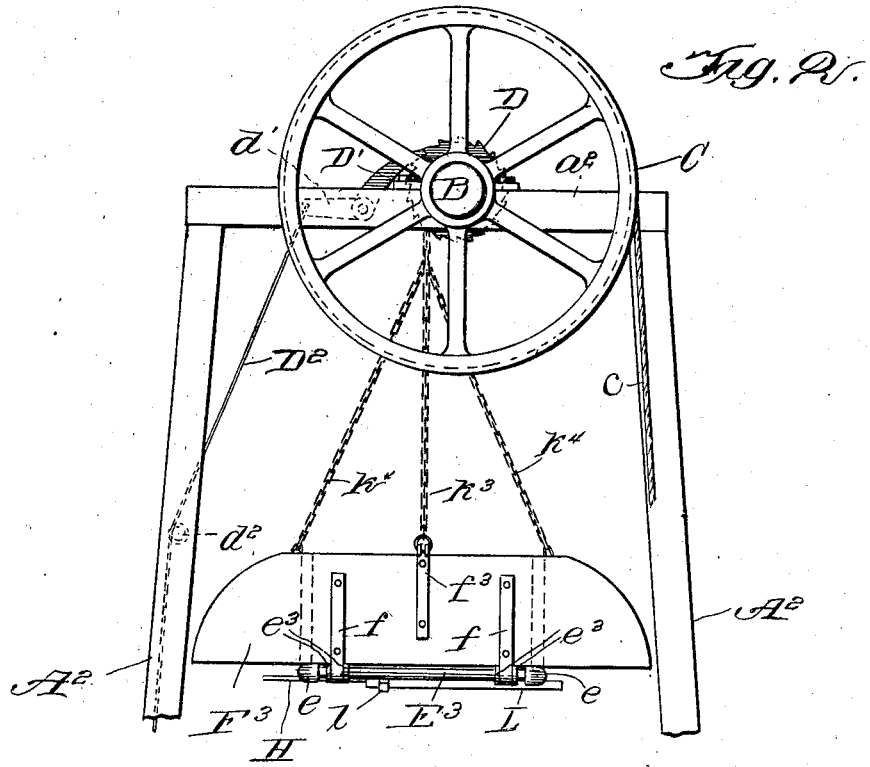

Figure 1 is a side elevational view; Fig. 2, an end elevation looking from the right in Fig. 1, and Fig. 3 a plan view of the under side of the hopper when spread out horizontally.

The same reference characters are used to indicate the same parts in the several figures of the drawings.

Reference characters $A'$ and $A^2$ designate pairs of standards the upper ends of which incline slightly toward each other and are rigidly united by parallel side beams $a$ and parallel end beams $a'$ and $a^2$. The lower ends of the standards are rigidly united together in any suitable manner—such, for instance, as by sills A, united by cross-strips $a^3$. The sills A rest upon the ground and may, if desired, be embedded so that their upper edges are flush with the surface of the ground, as shown in Fig. 1.

Journaled upon the end beams $a'$ and $a^2$ is a shaft B. Straps $b'$ and $b^2$ extend around the portions of the shaft immediately above the beams $a'$ $a^2$ to form bearings within which the shaft rotates. Fixed upon one end of the shaft—such, for instance, as the end which projects beyond the strap $b^2$—is a wheel C, the periphery of which is preferably provided with a spiral groove to receive a rope $c$. One end of the rope $c$ is secured to the periphery of the wheel C. The rope is then wound around the wheel one or more turns, after which it passes downwardly through a sheave M. The latter may be conveniently secured to one of the sills A, as shown in Fig. 1.

Fixed upon the end of the shaft B opposite to that on which the wheel C is secured is a ratchet-wheel D. A pawl $D'$ coöperates with the ratchet D and is pivoted to the outer surface of the top of the beam $a'$. The pawl $D'$ is provided with a rigid arm $d'$, extending laterally beyond its fulcrum, to the outer end of which a tripping-line $D^2$ is secured. This tripping-line extends around a guide-pulley $d^2$, fixed upon one of the standards, and thence depends adjacent one or more hooks $d^3$, with which a ring on the lower end of the line is adapted to be engaged.

My improved folding hopper, which is adapted to be elevated by the above-described or any suitable hoisting apparatus, consists in an open frame composed of the end sections $E'$ and $E^3$, united to side sections $E^2$ and $E^4$. The sections of the frame may conveniently be formed of pipe, the ends of which are screw-threaded so as to engage elbow-joints $e$, by means of which the ends and sides of the frame are rigidly united. The space within the frame is closed by a hinged bottom composed of two sections G' and G². The bottom sections are pivotally secured to the side portions E² and E⁴ of the frame by means of strap-hinges $g$, which surround the pipes composing the sides of the frame. The portions of the hinges which surround the pipe-sections are retained thereon by means of collars $e^2$ and $e^4$. In order that the sections G' and G² of the bottom may be retained horizontally within the frame, reciprocating bolts $h'$ $h^2$ are provided, the former of which is adapted to pass through registering holes in the straps $g'$ and $g^2$, secured to the respective sections of the bottom, while the bolt $h^2$ is adapted to pass through registering holes in straps $g^3$ and $g^4$, the former of which is secured to the section G' and the latter to the section G². Any suitable means may be provided for reciprocating the bolts $h'$ and $h^2$—such, for instance, as a lever H, fulcrumed upon sections G' by means of a staple $h$. The lever H is pivoted directly to the bolt $h^2$, while a rod H' pivotally connects the same at the opposite side of its fulcrum to the bolt $h'$. A guide $h^3$ is provided for the rod H', while an extended guide $h^4$ retains the lever H closely against the section G' of the bottom.

Figure 3:
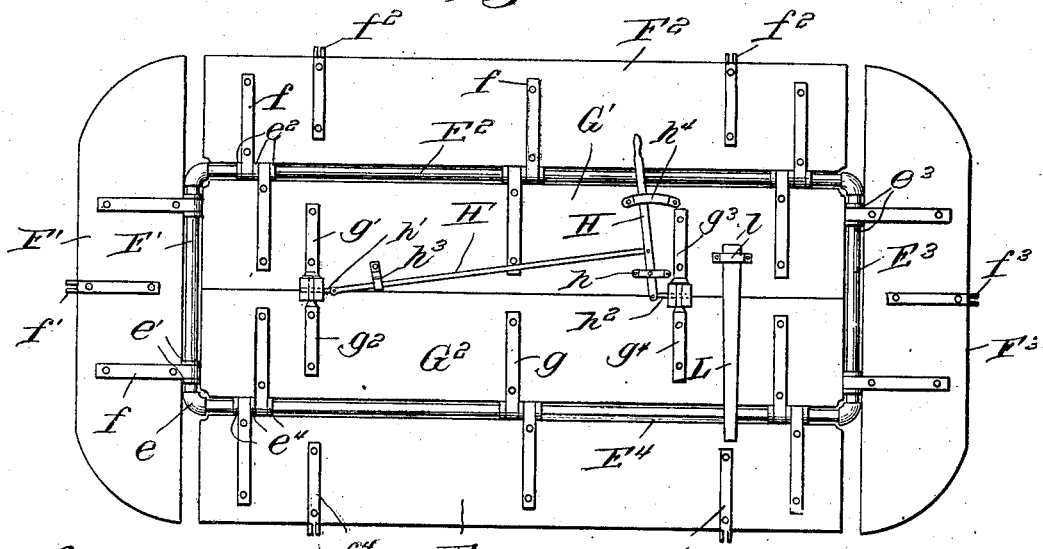

Side wings F² and F⁴ are pivotally connected to the sections E² and E⁴ of the frame by suitable hinges—such, for instance, as the straps $f$, which pass around the respective pipes E² and E⁴ of the frame—and are confined thereon between collars $e^2$ and $e^4$. End wings F' F³ are pivotally connected to the ends E' and E³ of the frame by strap-hinges $f$, which pass around the pipes composing the ends of the frame and are confined thereon by collars $e'$ and $e^3$, respectively. The end wings are of a length equal to the width of the frame and side wings when the latter are spread horizontally, as shown in Fig. 3.

The side wings F² and F⁴ are provided with hooks $f^2$ and $f^4$, respectively, to which are adapted to be secured the ends of elevating-chains $k^2$ and $k^4$. Two hooks are preferably provided on each side wing, as shown in Fig. 3. Similar hooks $f'$ and $f^3$ are secured to the end wings F' F³, to which chains $k'$ and $k^3$ are adapted to be secured. The chains $k'$ and $k^2$ are united, by means of a ring, to one end of a chain K', the opposite end of the latter being secured to the shaft B. A second chain K² is secured at one end to the shaft B and at its other end, by means of a ring, to the upper ends of the chains $k^3$ $k^4$. In order to facilitate closing the bottom-sections in a horizontal position, a lever L is provided, one end of which is secured within a staple $l$, fixed to one of the sections of the bottom.

The operation of my invention is as follows: The shaft B is allowed to rotate by disengaging the pawl D' from the ratchet D until the hopper rests upon the ground and the side and end wings occupy the same horizontal plane as the bottom thereof. The material which is to be loaded is then placed upon the hopper by a scraper or in any suitable manner, after which power is applied to the rope $c$, thereby rotating the shaft B and winding thereon the chains K' and K². The winding up of the chains K' and K² pulls upwardly upon the chains $k'$, $k^2$, $k^3$, and $k^4$, thereby swinging upwardly the side and end wings of the hopper, so as to inclose the material within the same. When the continued rotation of the shaft B has elevated the hopper to a sufficient height to permit a wagon being drawn thereunder, further rotation of the shaft is discontinued, and it is held in the position to which it has been rotated by the engagement of the pawl D' at the ratchet D. The lever H is then oscillated, so as to withdraw the bolts $h'$ $h^2$ from the straps on the sections of the bottom of the hopper, so that the weight of the material will swing downwardly the bottom sections and deposit the material in the wagon or other receptacle. The sections of the bottom may then be swung into horizontal position by means of the lever L and then locked in such position by reciprocating the bolts $h'$ and $h^2$ by means of the lever H. The hopper may then be lowered by disengaging the pawl from the ratchet-wheel and spread upon the ground preparatory to receiving another load of material from the scraper.

From the foregoing description it will be observed that I have invented an improved loading apparatus by means of which a quantity of material may be easily elevated from a position on the ground to a position above a wagon and then deposited in the wagon.

While I have described more or less precisely the details of construction, I do not wish to be understood as limiting myself thereto, as I contemplate changes in form, the proportion of parts, and the substitution of equivalents as circumstances may suggest or render expedient without departing from the spirit of my invention.

Having now fully described my invention, what I claim as new, and desire to secure by Letters Patent, is—

1. In an apparatus of the character described, the combination with a hopper having upwardly-swinging sides and a downwardly-swinging bottom whereby the hopper may be spread horizontally upon the ground, of means for detachably locking the bottom in a closed position, and means connected to the sides for elevating the hopper and simultaneously swinging upwardly the sides thereof to retain material in the hopper.

2. In an apparatus of the character described, the combination with a hopper having upwardly-swinging side wings and a downwardly-swinging bottom whereby the hopper may be spread horizontally upon the ground, of means for detachably locking the bottom in a closed position, flexible connections secured to the sides of the hopper, and means for elevating these flexible connections thereby swinging upwardly said side wings and simultaneously elevating the hopper.

3. The combination with a supporting structure, of a rotary shaft journaled on said structure, means for rotating said shaft, a hopper having upwardly-swinging side wings and a downwardly-swinging bottom, flexible connections secured to said side wings and to said shaft whereby when said shaft is rotated the side wings are swung upwardly and the hopper simultaneously elevated.

4. In a folding hopper, the combination with an open frame, of a bottom hinged to said frame to close the space within the same, side wings hinged to said frame to swing outwardly therefrom, means for locking said bottom in a closed position within said frame, and means connected to said side wings for swinging the same upwardly and simultaneously elevating said hopper.

5. The combination with a supporting structure, of a horizontal shaft journaled upon said structure, means for rotating said shaft, a folding hopper comprising an open frame, a horizontally-swinging bottom hinged to said frame, and side and end wings hinged to and swinging outwardly from said frame, flexible connections secured to said side and end wings and connected to said shaft whereby when said shaft is rotated the side and end wings are swung upwardly and the hopper simultaneously elevated, and means for detachably locking said bottom in a horizontal position to close the hopper.

In testimony whereof I sign this specification in the presence of two witnesses.

SIMON B. RAW.

Witnesses:
  CHAS. F. CASTLE,
  JOHN M. HOLMES.